Patented Nov. 8, 1932

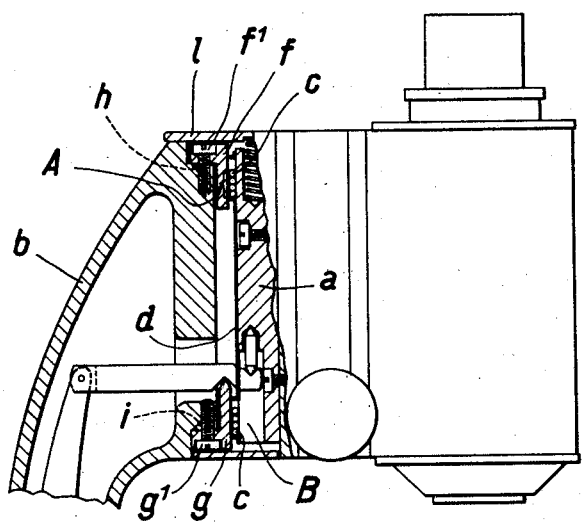
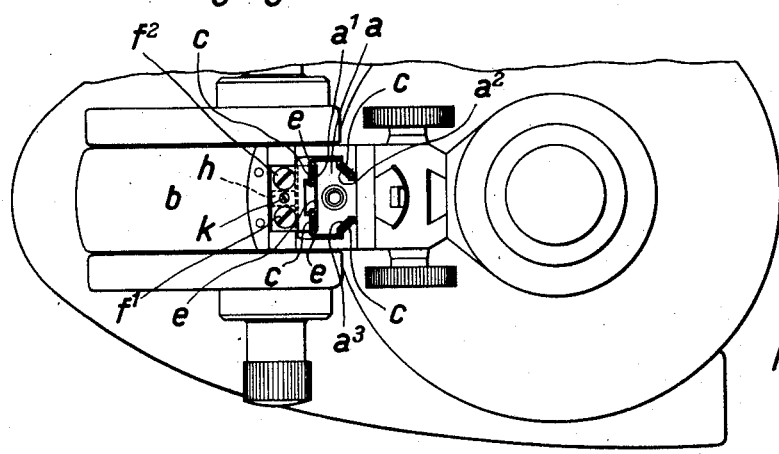
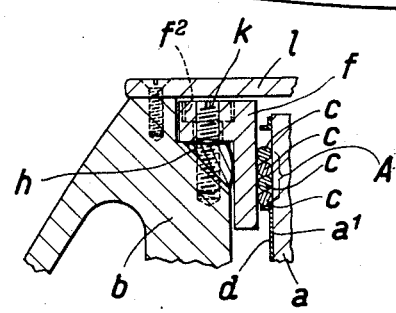

1,887,095

UNITED STATES PATENT OFFICE

HELMUT HEMSCHEIDT, OF JENA, GERMANY, ASSIGNOR TO THE FIRM OF CARL ZEISS, OF JENA, GERMANY

DEVICE FOR FINE FOCUSING OF MICROSCOPE TUBES

Application filed May 7, 1931, Serial No. 535,636, and in Germany May 22, 1930.

In devices for fine focusing of microscopes, in which a slide is displaceable between plane guiding surfaces, the guiding surfaces and the slide have been provided with intermediate rolling members, especially balls. The object of these members is to reduce friction and, particularly, to facilitate fitting, which must be effected with great care when guiding surfaces sliding direct upon each other are concerned. With a view to give the guiding surfaces between which the slide is moving the requisite mutual distance for the ball bearings, the parts provided with these surfaces have been rigidly connected with each other by means of intermediate fitting pieces. This proceeding, however, does not permit of completely avoiding the fitting work. In order to achieve this it has been suggested to dispense with the slide being guided on two sides, that is to say to have the guiding restricted to one single pair of guiding surfaces, to provide balls between the two surfaces of this pair of guiding surfaces, and to press these two surfaces upon each other by means of springs. One-side guiding, however, has the disadvantage that the guiding surfaces can be lifted from each other and that, the lifting power having been taken away, the microscope tube may not exactly resume its original position. This drawback has to be feared especially in the case of intermediate balls, and this because shocks and the like may cause these balls to make impressions in the guiding surfaces.

The invention permits of completely avoiding the fitting work also when the slide is guided on different sides by making adjustable at least the guide surfaces of one side of the slide. The whole microscope stand having been mounted and care having been taken that the just mentioned adjustment can be effected from outside, the adjustment of the guiding surfaces will permit of being effected very smoothly. The said adjustment can be repeated at any time.

The adjustment of the guiding surfaces is conveniently effected by pressure bodies, for instance by wedges or balls movable on surfaces inclined towards the guide direction, which can be displaced in the direction of the guiding surfaces by means of screws easily accessible from outside.

In order to obtain with the arrangement according to the invention a sure guide in two directions perpendicular to each other, that is to say to secure the tube against being displaced in these directions, the rolling members are conveniently disposed in three intersecting planes, for instance opposite the three guiding surfaces of a dove-tailed slide.

A specially suitable construction is attained by using as rolling members pins provided between the guiding surfaces, namely thin rollers of approximately two to three millimeters diameter, and by arranging these pins in groups in such a manner that the single members of each group lie loosely next to each other. The different groups are separated from each other by intermediate pieces attached to one of the guiding parts, either to the slide or to the guiding surfaces. Owing to their slight thickness the said pins permit the device to be a compact one also in the case of adjustable guiding surfaces. On account of the linear mutual touch of the pins and the guiding surfaces and of the provision of a greater quantity of pins close together, these pins afford the device a construction highly immune against shocks and the like.

The accompanying drawing shows by way of example part of a microscope stand provided with a device according to the invention. Figure 1 is a front elevation and, partly, a section, and Figure 2 a cross section. Figure 3 shows on an enlarged scale part of Figure 1.

In the stand shown in the drawing the slide of the fine adjustment device is a dove-tailed prism $a$ guided on three sides, $a^1$, $a^2$, $a^3$. Between the guiding surfaces of the three sides of the prism $a$ and the fixed part of the stand, $b$, are provided pins $c$ which are divided into upper and lower groups, A and, respectively, B. Two each of such groups A and B are separated by intermediate pieces $d$ fixed to the prism $a$. Metal sheets $e$ also fixed to the prism $a$ prevent sideward displacement of the pins $c$. Of the guiding surfaces of the stand part $b$ those opposite the prism side $a^1$ are adjustable perpendicularly to the moving direction of the prism $a$. The said guiding surfaces are represented by two angular pieces, $f$ and $g$, attached to the stand part $b$, whereof $f$ is the upper and $g$ the lower piece. These two angular pieces are rigidly connected to the part $b$, the upper piece by means of two bolts $f^1$ and $f^2$ and the lower one by means of two bolts $g^1$ and $g^2$. The holes provided for these bolts in the angular pieces $f$ and $g$ have diameters that allow these angular pieces $f$ and $g$ to be displaced to a certain extent relatively to the bolts $f^1$, $f^2$ and, respectively, $g^1$, $g^2$ in a direction perpendicular to the guiding surfaces. The part $b$ is recessed between the holes $f^1$ and $f^2$ and between the holes $g^1$ and $g^2$. These recesses are provided in the manner indicated in the drawing with wedges $h$ and $i$. A bolt $k$ fixed in the angular piece $f$ presses from above against the wedge $h$, and a corresponding bolt fixed in the angular piece $g$ presses from below against the wedge $i$. When the bolts $f^1$ and $f^2$ or $g^1$ and $g^2$ are not screwed tight, turning the bolt $k$ or the corresponding bolt of the angular piece $g$ adjusts the upper or the lower angular piece relatively to the pins $c$ and allows of exactly adjusting the required degree of the mutual pressure of guiding surfaces and pins. A plate $l$ serves for covering the guiding surfaces and can be easily removed.

I claim:

1. A microscope comprising a stand having plane guiding surfaces, a tube, a slide fixed to the tube, the slide being displaceable between the guiding surfaces, pins disposed between the guiding surfaces and the slide, the pins being arranged in groups, the pins of each group lying next to each other, intermediate pieces being disposed between the different groups, these intermediate pieces being fixed to one of the said parts for guiding the tube, the guiding surfaces of at least one side of the said slide being adjustable perpendicularly to the moving direction of the slide, and screws for adjusting the guiding surfaces, these screws being easily accessible from outside.

2. A microscope comprising a stand having plane guiding surfaces, a tube, a slide fixed to the tube, the slide being displaceable between the guiding surfaces, pins disposed between the guiding surfaces and the slide in at least three intersecting planes, the pins being arranged in groups, the pins of each group lying next to each other, intermediate pieces being disposed between the different groups, these intermediate pieces being fixed to one of the said parts for guiding the tube, the guiding surfaces of at least one side of the said slide being adjustable perpendicularly to the moving direction of the slide, and screws for adjusting the guiding surfaces, these screws being easily accessible from outside.

3. A microscope comprising a stand having plane guiding surfaces, a tube, a slide fixed to the tube, the slide being displaceable between the guiding surfaces, pins disposed between the guiding surfaces and the slide, the pins being arranged in groups, the pins of each group lying next to each other, intermediate pieces being disposed between the different groups, these intermediate pieces being fixed to one of the said parts for guiding the tube, the guiding surfaces of at least one side of the said slide being adjustable perpendicularly to the moving direction of the slide, pressure bodies acting against the adjustable guiding surfaces by means of inclined surfaces, and screws easily accessible from outside and acting against the said pressure bodies.

HELMUT HEMSCHEIDT.